United States Patent
Sun et al.

(10) Patent No.: US 8,550,351 B2
(45) Date of Patent: *Oct. 8, 2013

(54) MATRIX TYPE TWO-DIMENSIONAL BARCODE DECODING CHIP AND DECODING METHOD THEREOF

(75) Inventors: Yali Sun, Fuzhou (CN); Wenchuan Chen, Fuzhou (CN); Dong Guo, Fuzhou (CN); Tao Yang, Fuzhou (CN)

(73) Assignee: Fujian Newland Computer Co., Ltd., Fuzhou, Fujian Province (CN)

( * ) Notice: Subject to any disclaimer, the term of this patent is extended or adjusted under 35 U.S.C. 154(b) by 9 days.

This patent is subject to a terminal disclaimer.

(21) Appl. No.: 13/149,836

(22) Filed: May 31, 2011

(65) Prior Publication Data

US 2011/0290878 A1 Dec. 1, 2011

(30) Foreign Application Priority Data

Jun. 1, 2010 (CN) .......................... 2010 1 0189048

(51) Int. Cl.
*G06K 7/10* (2006.01)
*G06K 9/36* (2006.01)
*G06K 9/80* (2006.01)

(52) U.S. Cl.
USPC ........................................ 235/462.1

(58) Field of Classification Search
USPC .................... 235/437, 462.07, 462.1, 462.11, 235/462.15, 462.25, 454, 439, 440
See application file for complete search history.

(56) References Cited

U.S. PATENT DOCUMENTS

| | | | | |
|---|---|---|---|---|
| 6,685,095 | B2 * | 2/2004 | Roustaei et al. | 235/472.01 |
| 7,107,506 | B2 * | 9/2006 | Reichenbach | 714/758 |
| 7,264,174 | B2 * | 9/2007 | Chang et al. | 235/494 |
| 7,497,380 | B2 * | 3/2009 | Chang et al. | 235/462.09 |
| 7,546,950 | B2 * | 6/2009 | Thiyagarajah | 235/462.09 |
| 7,886,978 | B2 * | 2/2011 | Ofek et al. | 235/462.1 |
| 8,016,196 | B2 * | 9/2011 | Meier et al. | 235/462.01 |
| 2002/0044689 | A1 * | 4/2002 | Roustaei et al. | 382/199 |
| 2004/0020989 | A1 * | 2/2004 | Muramatsu | 235/462.1 |
| 2008/0029602 | A1 * | 2/2008 | Burian et al. | 235/462.09 |

* cited by examiner

*Primary Examiner* — Michael G Lee
*Assistant Examiner* — Seuzu Ellis
(74) *Attorney, Agent, or Firm* — Cheng-Ju Chiang

(57) ABSTRACT

An exemplary matrix-type two-dimensional (2D) barcode decoding chip includes a data storage, a matrix-type 2D barcode identifying modules, and a master-control logic module. The data storage is configured for storing a barcode image. The matrix-type 2D barcode identifying modules are configured for processing the barcode image in parallel. The master-control logic module is configured for controlling operational statuses of the matrix-type 2D barcode identifying modules so that the matrix-type 2D barcode identifying modules calling the barcode image stored in the data storage in sequence.

17 Claims, 9 Drawing Sheets

MATRIX TYPE TWO-DIMENSIONAL BARCODE DECODING CHIP AND DECODING METHOD THEREOF

CROSS-REFERENCE TO RELATED PATENT APPLICATIONS

This application claims the benefit, pursuant to 35 U.S.C. §119(a), of P.R. China Patent Application No. 201010189048.3, filed on Jun. 1, 2010, entitled "Matrix-Type Two-Dimensional Barcode Decoding Chip and Decoding Method Thereof" by Yali Sun, Wenchuan Chen, Dong Guo and Tao Yang, the disclosure for which is hereby incorporated herein in its entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present disclosure generally relates to the technical field of barcode identification, and more particularly, to a matrix-type two-dimensional (2D) barcode decoding chip and a decoding method thereof.

BACKGROUND OF THE INVENTION

Conventionally, in a process of decoding a matrix-type two-dimensional barcode, a photographic device is used to take a picture of the barcode so as to get a barcode image, and then processes such as denoising, grayscale extraction, adaptive brightness equalization, binarization, codeword extraction and decoding are carried out on the barcode image. However, in the prior 2D barcode identifying method described above, the adaptive brightness equalization and the binarization of the barcode image are carried out on each of the pixels respectively. Therefore, the grayscale of each of the pixels must be adjusted and then compared with a grayscale threshold. This represents a great computational burden and lowers the speed of the system.

In view of the shortcomings of the prior art, what are needed, therefore, are a matrix-type two-dimensional barcode decoding chip and a decoding method thereof which can ensure quick and successful execution of a decoding process.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

Figure 1:
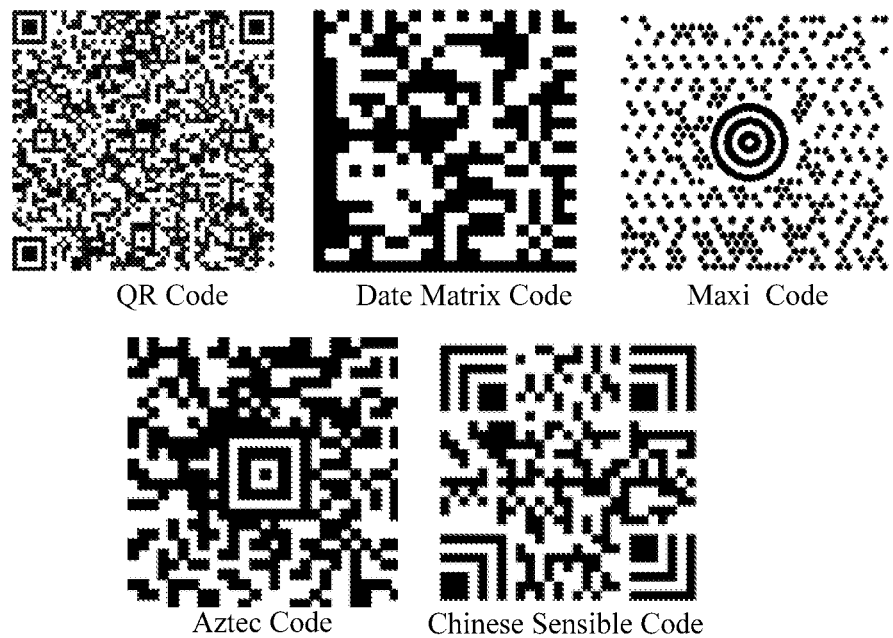
FIG. 1 is a schematic view of barcode symbol patterns of various matrix-type 2D barcodes according to the present disclosure.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

To facilitate better understanding of the present disclosure by those skilled in the art, the following terms related to barcodes are provided for reference. Some of the barcode terms are from the National Standard GB/T 12905-2000 of the People's Republic of China, and are not intended to limit the present disclosure.

Barcode symbol: a combination of bars or blanks or a combination of image modules representing information defined by a certain kind of barcode.

Codeword: a codeword represents an intermediate value occurring when a source data is transformed into a barcode symbol. The number of codewords in a symbol determines the number of all symbols in the barcode symbol.

Data codeword: a data codeword represents a value of a data symbol.

Error correction codeword: an error correction codeword represents a value of an error correction symbol.

Image module: as the smallest independent unit in a matrix-type 2D barcode, an image module represents a bit of binary data.

Functional pattern: a kind of specific pattern in a matrix-type 2D barcode symbol for symbol positioning and characteristic identification, including detection patterns, positioning patterns, correction patterns and the like.

Detection pattern: a kind of special pattern in a matrix-type 2D barcode symbol pattern for symbol positioning in a barcode image; also termed as a position detection pattern.

Positioning pattern: a kind of pattern in a matrix-type 2D barcode symbol pattern for determining pixel coordinates of an image module in the symbol.

Correction pattern: a kind of fixed reference pattern in a matrix-type 2D barcode symbol pattern for determining a position of a symbol. In case a certain extent of distortion or stain exists in a barcode image, the correction pattern can be used to correct pixel coordinates of an image module in the barcode image.

Coding region: a region in the matrix-type 2D barcode symbol pattern that is unoccupied by any functional pattern. The coding region is used to encode data and error correction codewords and represent data symbols and error correction symbols.

Version: a sequence representing specifications of a matrix-type 2D barcode symbol, which reflects a symbol size, the number of image modules in the symbol and arrangement of image modules in the symbol.

Version information: a kind of functional pattern in a matrix-type 2D barcode symbol pattern for determining a version No. of a matrix-type 3D barcode symbol.

Format: representing an error correction level and a mask pattern used by a matrix-type 2D barcode symbol.

Format information: a kind of functional pattern in a matrix-type 2D barcode symbol pattern for determining an error correction level and a mask pattern used by a matrix-type 2D barcode symbol.

Mask pattern: a mask pattern is used for an XOR operation on a bit map in the coding region for purpose to equalize the ratio of dark-colored image modules and light-colored image modules in the symbol and reduce occurrence of patterns that might influence the processing of the barcode image.

Binarized barcode image: a grayscale barcode image is processed by using a global threshold or a local threshold to obtain a binarized barcode image with only a dark color and a light color.

Threshold: a threshold is a boundary value that separates two inspection levels from each other, and a value of the threshold per se is a lower limit of the upper level.

Image module error: an image module error means that, in a binarized barcode image, dark and light color statuses of an image module are inverse to the design.

Pixel: a unit in a barcode image that corresponds to a single photosensitive unit in a photosensitive array (e.g., a CCD or CMOS device). A pixel is generally considered as the minimum integral unit of the barcode image. A digital barcode image is generally stored in the unit of pixels, and a pixel is a unit having the minimum area in the digital barcode image.

FIG. 1 is a schematic view of barcode symbol patterns of various matrix-type 2D barcodes according to the present disclosure. FIGS. 2 to 6 are schematic views illustrating functions of the barcode symbol patterns of the various matrix-type 2D barcodes according to the present disclosure. To make it easier for those skilled in the art to understand the present disclosure, a brief description will be made on the matrix-type 2D barcode with reference to FIGS. 1 to 6 hereinafter.

FIG. 1 shows five matrix-type 2D barcodes, including a QR code, a Data Matrix code, a Maxi code, an Aztec code and a Chinese sensible code. As shown in FIG. 1, the matrix-type 2D barcodes have characteristics similar to an arithmetic matrix in terms of the structural form and element arrangement thereof. The matrix-type 2D barcode symbols have a common characteristic that they are all composed of specific symbol functional patterns and pattern image modules that are distributed at elemental positions of the matrix to represent data information (e.g., square pattern image modules, circular pattern image modules, equilateral polygonal pattern image modules and etc). Each dark-colored image module unit represents a binary bit of "1", and each light-colored image module unit represents a binary bit of "0" (of course, alternatively, it may also be that each dark-colored image module unit represents a binary bit of "0", and each light-colored image module unit represents a binary bit of "1"). A data codeword flow is represented by different combinations of unit image modules distributed at matrix elemental positions. Symbols of most of matrix-type 2D barcodes are comprised of eight image modules arranged in a particular rule. Each kind of matrix-type 2D barcode has a unique functional pattern which is used for symbol identification, determination of symbol positions and image module parameters, correction of a symbol image module, and the like.

As shown in FIGS. 2 to 6, at the periphery of the matrix-type 2D barcode symbol patterns is a blank region, which is a region surrounding the symbol patterns. The blank region has a reflectivity identical to that of the light-colored image modules, which facilitates the searching for characteristics in the barcode symbol patterns. The matrix-type 2D barcode symbol patterns have a common characteristic that they all include two major sections, namely, functional patterns and a coding region. The functional patterns include position detection patterns for detecting a barcode position and identifying a barcode type, and correction patterns, positioning patterns or directing patterns for correcting or positioning a position of a symbol image module. The coding region includes symbol information (the barcode symbol information includes version information representing the way in which the image modules are arranged and the number of image modules, and format information representing an error correction level, an error correction bit, a mask pattern and the like), a data codeword and error correction codeword region.

Figure 2:
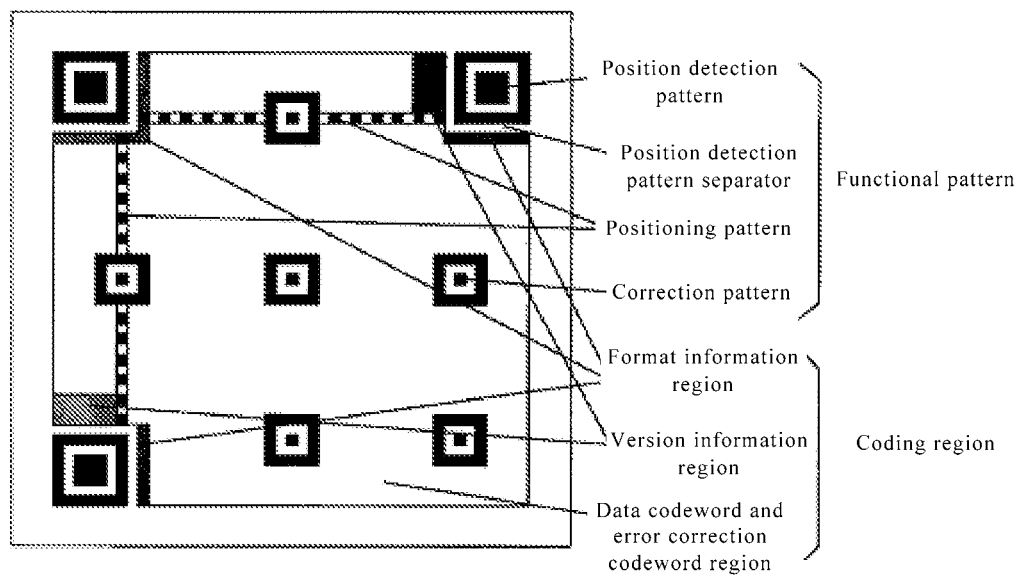
FIGS. 2 to 6 are schematic views illustrating functions of the barcode symbol patterns of the various matrix-type 2D barcodes according to the present disclosure.

FIG. 2 is a schematic view illustrating functions of symbol patterns of a QR code. The functional patterns of the QR code include position detection patterns, position detection pattern separators, correction patterns, and positioning patterns. The coding region comprises a version information region and a format information region that represents symbol information, and a data codeword and error correction codeword region.

Figure 3:
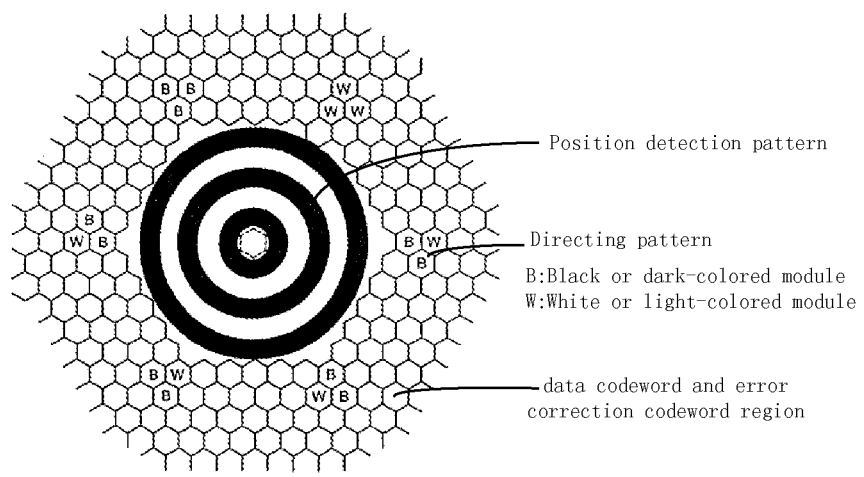

FIG. 3 is a schematic view illustrating functions of symbol patterns of a Maxi Code. The functional patterns of the Maxi Code include position detection patterns and directing patterns. Because the symbol information of the Maxi Code is unique and fixed (i.e., the way in which the image modules are arranged, the number of the image modules and the error correction level are all unique), the coding region of the Maxi Code has no region representing the symbol information but only has a data codeword and error correction codeword region.

Figure 4:
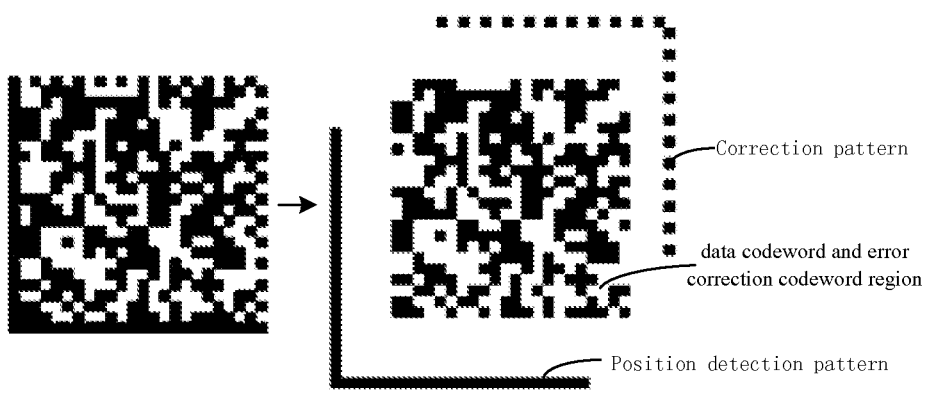

FIG. 4 is a schematic view illustrating functions of symbol patterns of a Data Matrix code. There are two kinds of Data Matrix codes: ECC000-140 and ECC200. ECC000-140 adopts a convolution code error correction scheme, while ECC200 adopts a Reed-Solomon algorithm error correction scheme. Currently, most researches and applications related to Data Matrix codes focus on the ECC 200 Matrix codes, and there are only a few applications of ECC000-140. Functional patterns of the Data Matrix code include position detection patterns and correction patterns. The coding region includes a version information and format information region that represents the symbol information, and a data codeword and error correction codeword region. The symbol encoding of the ECC 200 Data Matrix code doesn't adopt any mask pattern and error correction thereof is associated with the way in which the image modules are arranged, so the coding region of the ECC 200 Data Matrix code has no region representing the symbol information but only has a data codeword and error correction codeword region.

Figure 5:
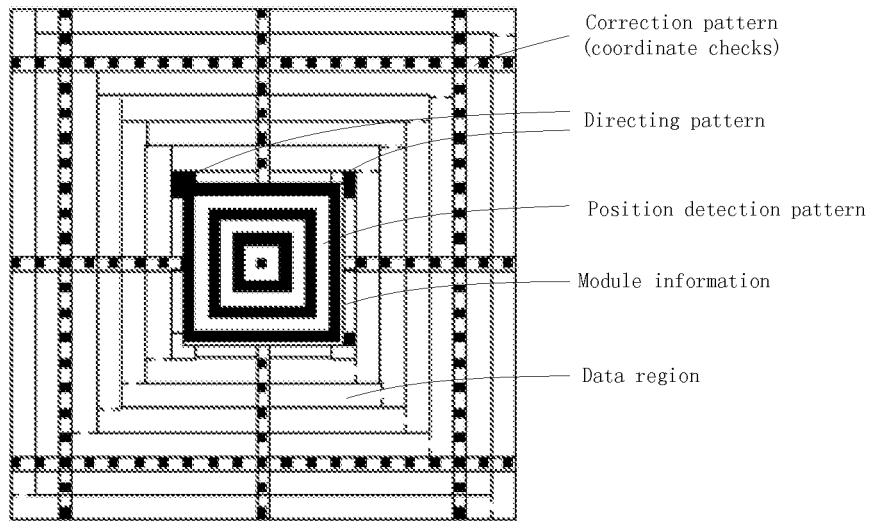

FIG. 5 is a schematic view illustrating functions of symbol patterns of an Aztec Code. Functional patterns of the Aztec Code include position detection patterns, directing patterns, and correction patterns (coordinate checks). The coding region includes image module information that represents symbol information, and a data region. There are two kinds of Aztec Codes, namely, compact Aztec Codes of a small size and Aztec Codes of a large size. A compact Aztec Code has no correction pattern. A correction pattern provides a coordinate reference for precise distribution of image modules in the Aztec Code. The position detection pattern is a bull-eye shaped image as shown in FIG. 5. The image module information includes the number of layers of image modules, the number of bits of image modules and an error correction level of the whole barcode.

Figure 6:
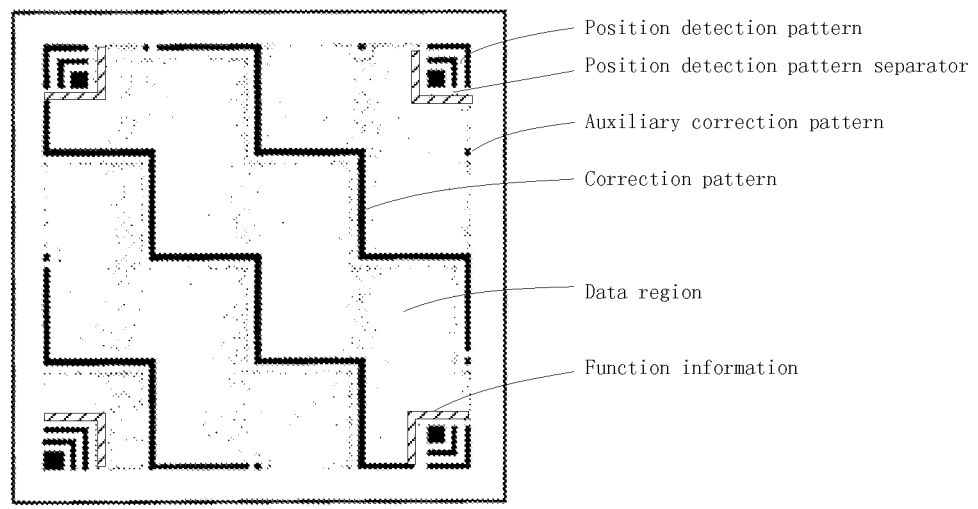

FIG. 6 is a schematic view illustrating functions of symbol patterns of a Chinese sensible code. Functional patterns of the Chinese sensible code include position detection patterns, position detection pattern separators, correction patterns and auxiliary correction patterns. The coding region includes function information regions representing symbol information, and a data region representing a data codeword and an error correction codeword.

Figure 7:
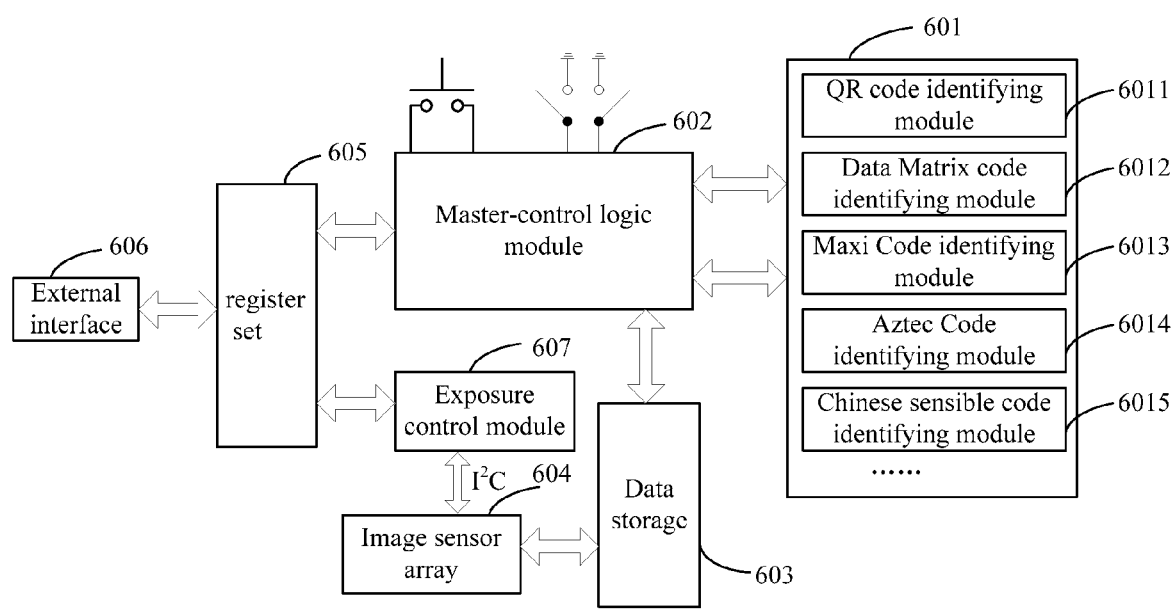
FIG. 7 is a schematic block diagram of a hardware logic framework of a matrix-type 2D barcode decoding chip according to an embodiment of the present disclosure.

FIG. 7 is a schematic block diagram illustrating a hardware logic framework of a matrix-type 2D barcode decoding chip according to an embodiment of the present disclosure. In this embodiment, the matrix-type 2D barcode decoding chip can be totally implemented by hardware logics and integrated into an integrated chip. The matrix-type 2D barcode decoding chip includes a data storage 603, a master-control logic module 602, a register set 605, an external interface 606 and at least one matrix-type 2D barcode identifying module 601. The register set 605 isolates the data storage 603, the master-control module 602 and the matrix-type 2D barcode identifying module 601 from the outside. The data storage 603 is configured for storing a barcode image or segments of the image. The at least one matrix-type 2D barcode identifying module 601 includes at least one of identifying sub-modules adopting various matrix-type 2D barcode identifying rules. The identifying sub-modules include but are not limited to a QR code identifying module 6011, a Data Matrix code identifying module 6012, a Maxi Code identifying module 6013, an Aztec Code identifying module 6014, a Chinese sensible code identifying module 6015 and the like.

The matrix-type 2D barcode decoding chip further includes an image sensor array 604 and an exposure control module 607. The exposure control module 607 controls the image sensor array 604 via an I²C bus to control an operation status of the image sensor array 604. Furthermore, luminance information of the image sensor array 604 may be transmitted to the exposure control module 607 so that the exposure control module 607 can put a corresponding control logic into the register set 605 according to the luminance information. Then, the master-control logic module 602 acquires the control logic from the register set 605 and controls operation of the matrix-type 2D barcode identifying module 601 according to the control logic, for example, to enable or disable the operation thereof.

The master-control logic module 602 has control logics corresponding to desired control statuses. By triggering a switch electrically connected to the master-control logic module 602, a desired control status can be chosen, for example, to enable the matrix-type 2D barcode identifying module 601, acquire the barcode image from the data storage 603 and transmit the barcode image to the matrix-type 2D barcode identifying module 601, and etc. Furthermore, the master-control logic module 602 may also provide a data transmission channel; for example, the master-control logic module 602 can transmit the barcode image stored in the data storage 603 to the matrix-type 2D barcode identifying module 601 via the master-control logic module 602, and control the operation status of the matrix-type 2D barcode identifying module 601. The master-control logic module 602 is not provided with a computing capability, but can trigger a corresponding event according to certain conditions. Specifically, the master-control logic module 602 may be implemented by a conventional state machine. All of various computing processes on the barcode image are implemented by the matrix-type 2D barcode identifying module 601 under the coordination and control of the master-control logic module 602.

In this embodiment, the QR code identifying module 6011, the Data Matrix code identifying module 6012, the Maxi Code identifying module 6013, the Aztec Code identifying module 6014, and the Chinese sensible code identifying module 6015 of the matrix-type 2D barcode identifying module 601 may call the barcode image or segments of the image from the data storage 603 sequentially under the control of the master-control logic module 602. After the barcode image or image segments that satisfy the identifying conditions are transmitted to the data storage 603, the data storage 603 transmits this status to the master-control logic module 602. Upon receiving this status, the master-control logic module 602 controls a certain identifying sub-module (e.g., the QR code identifying module 6011) in the matrix-type 2D barcode identifying module 601 to call the barcode image or image segments from the data storage 603. After completion of calling the barcode image or image segments, the QR code identifying module 6011 begins to identify or process the barcode image or image segments. At this point, the master-control logic module 602 controls another identify sub-module (e.g., the Data Matrix code identifying module 6012) to call the barcode image or image segments from the data storage 603. Because the time required for identifying a barcode is much longer than that required for calling the barcode image or image segments, the QR code identifying module 6011 and the Data Matrix code identifying module 6012 can identify or process the barcode image or image segments in parallel at the same time. After the Data Matrix code identifying module 1012 have completed calling the barcode image or image segments, the master-control logic module 602 can control another identifying sub-module (e.g., the Maxi Code identifying module 6013) to call the barcode image or image segments.

If one of the QR code identifying module 6011, the Data Matrix code identifying module 6012 and the Maxi Code identifying module 6013 correctly identifies the barcode information, the master-control logic module 602 controls the other identifying modules to stop the identifying operations. During the identifying process, if a subsequent barcode image or image segment is continuously transmitted to the data storage 603, then after the QR code identifying module 6011, the Data Matrix code identifying module 6012 and the Maxi Code identifying module 6013 have completed identification or processing of the previous barcode image or image segment, the master-control logic module 602 will control the QR code identifying module 6011, the Data Matrix code identifying module 6012 and the Maxi Code identifying module 6013 to further call from the data storage 603 the subsequent barcode image or image segment for identification or processing.

In a preferred embodiment, if one of the QR code identifying module 6011, the Data Matrix code identifying module 6012 and the Maxi Code identifying module 6013 have correctly identified the barcode information in the previous barcode image identifying operation, then when the subsequent barcode image is to be identified, the master-control logic module 602 controls this identifying module to preferentially call the subsequent barcode image.

With the aforesaid framework, the resources can be allocated in a reasonable way according to the processing progress of the matrix-type 2D barcode identifying module 601 so as to further increase the operating speed of the barcode image parallel processing framework.

Figure 8:
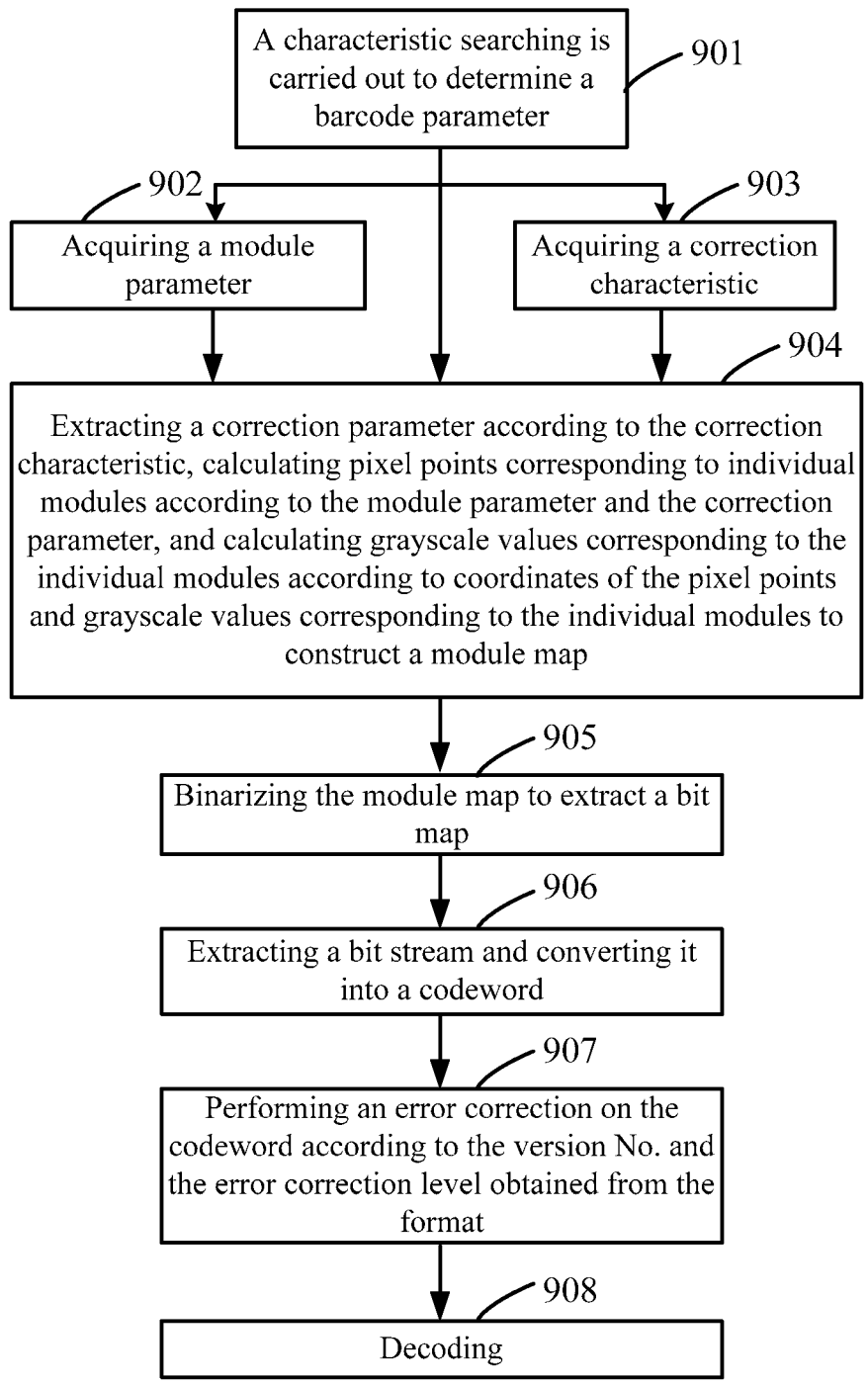
FIG. 8 is a flowchart of a decoding method for a matrix-type 2D barcode identifying module according to an embodiment of the present disclosure.

Hereinafter, a decoding method for a matrix-type 2D barcode identifying module according to the present disclosure will be detailed. FIG. 8 is a flowchart of a decoding method for a matrix-type 2D barcode identifying module according to an embodiment of the present disclosure.

As shown in FIG. 8, in a step 901, a characteristic searching is carried out in the barcode image to determine pixel coordinates of functional patterns, and barcode parameters are calculated according to the pixel coordinates of the functional patterns and an image module dimension ratio. The barcode parameters include a barcode region, a barcode direction or barcode module dimensions, image module coordinates and etc. In an implementation of the present disclosure, this step may be accomplished by detecting functional patterns, particularly position detection patterns or correction patterns, through template matching. In another implementation of the present disclosure, this step may also be accomplished through scale detection, which includes: detecting boundary points between dark-colored and light-colored image modules in the barcode image through scanning; comparing a spacing relationship of the boundary points between the dark-colored and light-colored image modules with an image module dimension scale of the position detecting patterns or correction patterns; and determining pixel coordinates of the characteristic pattern in the barcode image according to the comparison result.

Furthermore, the present disclosure also provides a method of identifying a matrix-type 2D barcode through row and column line detection, which method includes the following steps of: extracting a plurality of black-white boundary line segments of a predetermined length within a predetermined region of the barcode image; forming a plurality of straight lines from the plurality of black-white boundary line segments; grouping the plurality of straight lines into a row parallel line group and a column parallel line group according to characteristics of parallel lines; identifying a type of the matrix-type 2D barcode by making a determination on a grid formed by the row parallel line group and the column parallel line group according to characteristics of the matrix-type 2D barcode; acquiring the pixel coordinates of the characteristic pattern of the grid formed by the row parallel line group and the column parallel line group, and acquiring a barcode parameter according to pixel coordinates of the characteristic pattern.

In a step 902, according to the pixel coordinates of the functional patterns and barcode parameters, version information and format information are extracted from the barcode image and decoded to acquire the version and format parameters including, for example, the version No., the error correction level or the mask pattern. In some cases, when the version information and format information region in the barcode image are stained to cause failure to read the data, the format and the version of the barcode can be estimated according to the type of the barcode. The format includes a mask pattern or an error correction level. For example, the version and the format can be estimated by permuting and combining possible versions, mask patterns or error correction levels. As an example, the version and the format are estimated by permuting and combining the 1~40 versions of the QR code, the four error correction levels L, M, Q and H, and the mask pattern, and then subsequent processings are carried out on the barcode image according to the estimated format and version.

In a step 903, a characteristic pattern, e.g., a corner point of the barcode image, a position detection pattern, a correction pattern, a positioning pattern, a dynamic characteristic template, a scribing characteristic template or the like, is searched in the barcode image. Then, correction characteristics including, for example, pixel coordinates and a grayscale value of the correction point, are obtained according to the characteristic pattern.

In a step 904, an image module parameter is determined according to the version parameter, image module coordinates corresponding to the correction characteristic are calculated according to the correction characteristic, the image module parameter and the barcode parameter, and a correction parameter is calculated according to the pixel coordinates and the image module coordinates of the correction characteristic. The correction parameter reflects the mapping relationship between the pixel points of the barcode image and the barcode modules. Then, pixel points corresponding to individual image modules are calculated according to the image module parameter and the correction parameter, and grayscale values corresponding to the individual image modules are calculated according to the coordinates and grayscale values of the pixel points corresponding to the individual image modules to construct an image module map.

In a step 905, the image module map is binarized to extract a bit map.

In a step 906, according to the mask pattern obtained in the step 902, a de-masking operation (e.g., an XOR operation) is carried out on the bit map to remove the mask and restore a bit stream representing a data codeword and an error correction codeword. If no mask pattern is used when the barcode symbol is encoded, then this step can be omitted.

In a step 907, according to the arrangement rules of matrix-type 2D barcodes, the bit stream is extracted and converted into the data codeword and the error correction codeword.

In a step 908, according to the version No. and the error correction level obtained in the step 902, the data codeword and the error correction codeword are re-arranged in terms of blocks, and error detection and error correction operations are performed thereon to correct deletion errors and unknown errors until the maximum error correction capacity defined by the version No. and the error correction level is reached. Then, a data block sequence is re-assembled to restore a data bit stream representing the matrix-type 2D barcode information.

In a step 909, the restored data bit stream is decoded to obtain the matrix-type 2D barcode information.

Figure 9:
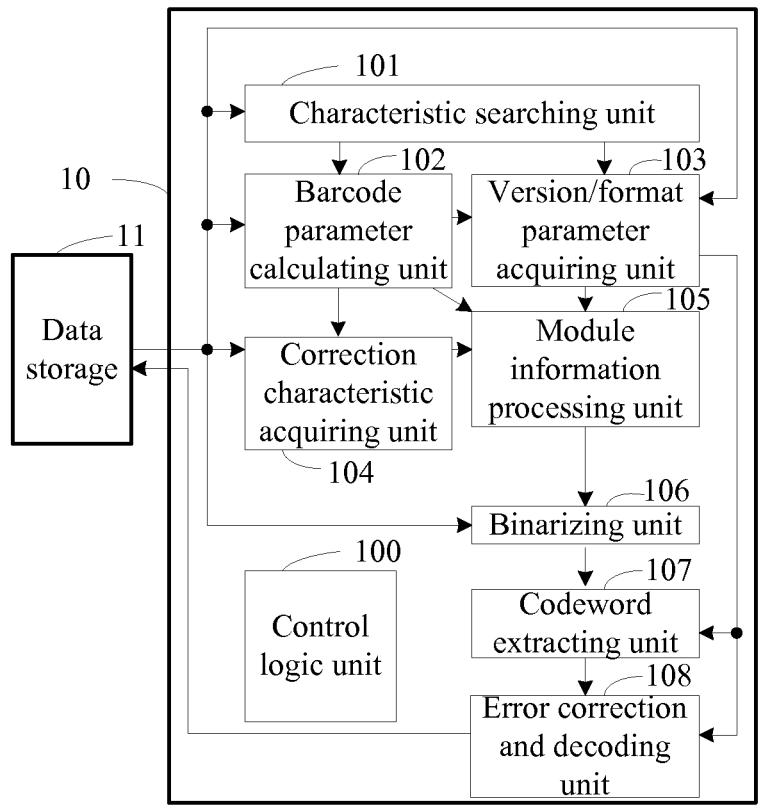
FIG. 9 is a schematic structural view of a matrix-type 2D barcode identifying module according to an embodiment of the present disclosure.

Hereinafter, the matrix-type 2D barcode identifying module according to the present disclosure will be detailed. FIG. 9 is a schematic structural view of a matrix-type 2D barcode identifying module according to an embodiment of the present disclosure.

As shown in FIG. 9, the data storage 11 stores a barcode image, and the matrix-type 2D barcode identifying module 10 identifies and decodes the barcode image stored in the data storage 11. The matrix-type 2D barcode identifying module 10 includes a control logic unit 100, a characteristic searching unit 101, a barcode parameter acquiring unit 102, a version and format parameter acquiring unit 103, a correction characteristic acquiring unit 104, an image module information processing unit 105, a binarizing unit 106, a codeword extracting unit 107 and an error correction and decoding unit 108.

The control logic unit 100 is configured to control the operation statuses and processing flows of the characteristic searching unit 101, the barcode parameter acquiring unit 102, the version and format parameter acquiring unit 103, the correction characteristic acquiring unit 104, the image module information processing unit 105, the binarizing unit 106, the codeword extracting unit 107 and the error correction and decoding unit 108. The control logic unit 100 performs the controlling operations in the form of a finite state machine. A finite state machine is also termed as a finite state automatic machine or just briefly termed as a state machine, and is a state logic representing a finite number of states as well as transitions and actions between these states. The control logic unit 100 may be implemented by programmable logic devices, programmable logic controllers, logic gates and triggers. In a preferred embodiment, the control logic unit 100 includes a register, a combined logic for determining state transitions and a combined logic for determining an output of a state control module. The register is configured for storing state variables.

The characteristic searching unit 101 determines pixel coordinates of characteristic patterns in the barcode image by searching for the characteristic pattern in the barcode image. The characteristic patterns include but are not limited to functional patterns of the barcode, such as position detection patterns, correction patterns, positioning patterns and the like. In a preferred embodiment, the characteristic searching unit 101 searches for position detection patterns through template matching; specifically, a position detection pattern detecting template is generated according to an image module dimension ratio of the position detection patterns. Then, the position detection pattern detecting template is translated relative to the barcode image and a grayscale matching operation is performed thereon to determine an optimal matching position between the position detection pattern detecting template and the barcode image, and pixel coordinates of central points or marginal points of the position detection patterns in the barcode image are determined according to the optimal matching position. In another embodiment of the present disclosure, the characteristic searching unit 101 may also determine pixel coordinates of the characteristic patterns in the barcode image through scale detection, which includes: detecting boundary points between dark-colored and light-colored image modules in the barcode image through scanning; comparing a spacing relationship of the boundary points between the dark-colored and light-colored image modules with an image module dimension scale of the position detecting patterns or correction patterns; and determining pixel coordinates of the characteristic pattern in the barcode image according to the comparison result. Furthermore, the present disclosure also provides an embodiment of identifying a matrix-type 2D barcode through row and column line detection, which includes the following steps executed by the characteristic searching unit 101: extracting a plurality of black-white boundary line segments of a predetermined length within a predetermined region of the barcode image; forming a plurality of straight lines from the plurality of black-white boundary line segments; grouping the plurality of straight lines into a row parallel line group and a column parallel line group according to characteristics of parallel lines; identifying a type of the matrix-type 2D barcode by making a determination on a grid formed by the row parallel line group and the column parallel line group according to characteristics of the matrix-type 2D barcode; and acquiring the pixel coordinates of the characteristic pattern of the grid formed by the row parallel line group and the column parallel line group.

The barcode parameter acquiring unit 102 calculates a barcode parameter (e.g., a barcode direction, a barcode region, and etc.) according to pixel coordinates of the functional pattern detected by the characteristic searching unit 101. Further, according to the pixel coordinates and the image module dimension ratio of the functional patterns, the barcode parameter acquiring unit 102 may further calculate a range of the barcode region and roughly calculate a barcode module size (i.e., a ratio of the barcode module size to the pixel width), and further estimate the image module coordinates according to the range of the barcode region and the barcode module size.

The version and format parameter acquiring unit 103 extracts version information and format information from the barcode image according to the pixel coordinates of the functional patterns and the barcode parameters detected by the characteristic searching unit 101, and decodes the version information and the format information to obtain the version and format parameters. The version information and the format information of the coding region are disposed adjacent to the position detection patterns, so the version and format parameter acquiring unit 103 can search version information and format information regions according to the pixel coordinates of the position detection patterns, the barcode direction and the barcode module size, and then obtain the version and format parameters (e.g., the version No., the error correction level, the mask pattern, and etc.) through binarizing and error correction and decoding operations.

In some cases, the version information and format information regions in the barcode image may be stained to cause failure to read the data. In such cases, the version and format parameter acquiring unit 103 can estimate the format and the version of the barcode according to the type of the barcode. The format includes a mask pattern and an error correction level. For example, the version and the format can be estimated by permuting and combining possible versions, mask patterns or error correction levels.

By searching for characteristic positions in the barcode image, e.g., corner points of the barcode image, position detection patterns, correction patterns, positioning patterns, dynamic templates or the like, the correction characteristic acquiring unit 104 acquires the correction characteristics according to the characteristic positions. The correction characteristics include, for example, pixel coordinates or image module coordinates as well as a grayscale value of the correction point. The correction characteristic acquiring unit 104 may be implemented in various ways, but is not merely limited to acquiring the correction characteristics according to the correction patterns.

Figure 10:
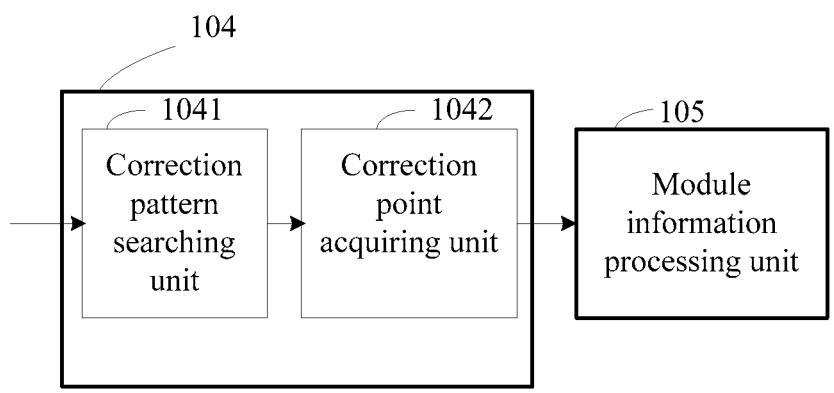
FIG. 10 is a schematic view of a first kind of correction point acquisition structure of a correction characteristic acquiring unit in a matrix-type 2D barcode identifying module according to an embodiment of the present disclosure.

FIG. 10 is a schematic view of a first kind of correction point acquisition structure of a correction characteristic acquiring unit in a matrix-type 2D barcode identifying module according to an embodiment of the present disclosure. As shown in FIG. 10, the correction characteristic acquiring unit 104 includes a correction pattern searching unit 1041 and a correction point acquiring unit 1042. Similar to the characteristic searching unit 101, by referring to the image module dimension ratio of the correction pattern and the barcode parameter, the correction pattern searching unit 1041 generates a correction pattern detecting template according to the image module dimension ratio of the correction pattern. Then, the correction pattern detecting template is translated relative to the barcode image and a grayscale matching operation is performed thereon. The correction point acquiring unit 1042 calculates similarities of the matching results to determine an optimal matching position between the correction pattern detecting template and the barcode image, and determines the pixel coordinates and grayscale values of a central point or marginal points of the correction pattern in the barcode image according to the optimal matching position.

The image module information processing unit 105 determines the image module parameter according to the version parameter, calculates image module coordinates corresponding to the correction characteristics according to the correction characteristics, the image module parameter and the barcode parameter, and calculates a correction parameter according to the pixel coordinates and the image module coordinates of the correction characteristics. The correction parameter reflects a mapping relationship between pixel points of the barcode image and the barcode modules. Then, the image module information processing unit 105 calculates pixel points corresponding to individual image modules according to the image module parameter and the correction parameter, and calculates grayscale values corresponding to the individual image modules according to the coordinates and grayscale values of the pixel points corresponding to the individual image modules so as to construct an image module map.

Figure 11:
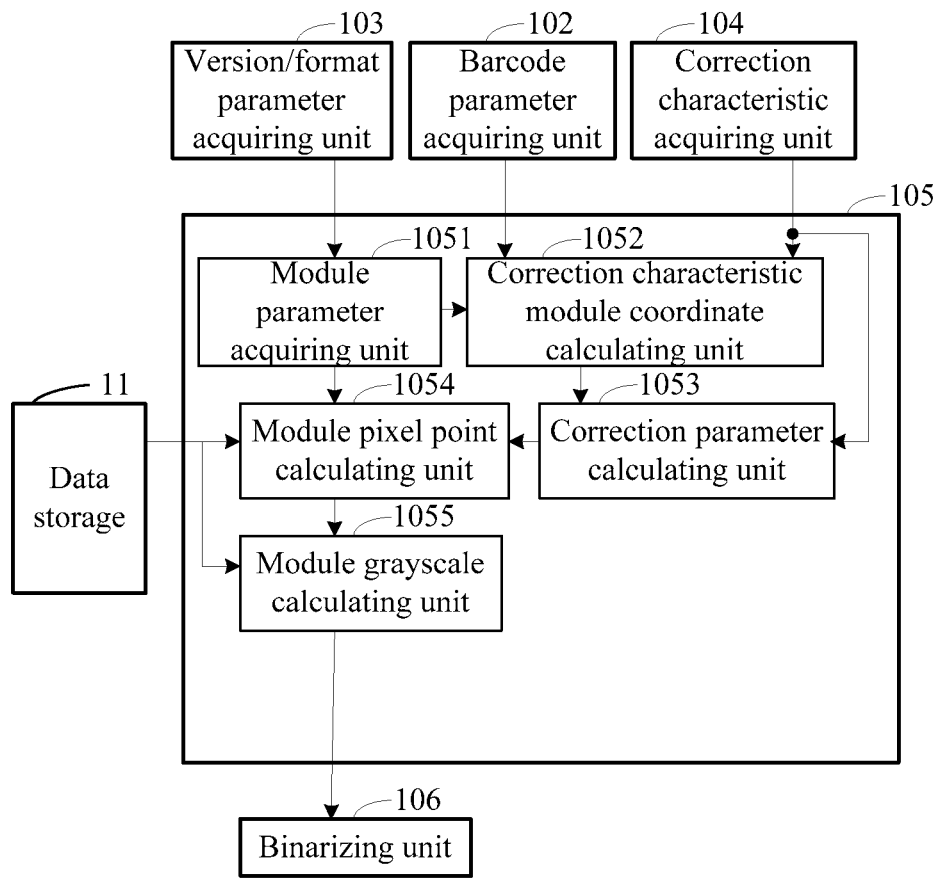
FIG. 11 is a schematic structural view of an image module information processing unit in a matrix-type 2D barcode identifying module according to an embodiment of the present disclosure.

FIG. 11 is a schematic structural view of a module information processing unit in a matrix-type 2D barcode identifying module according to an embodiment of the present disclosure. The image module information processing unit 105 includes an image module parameter calculating unit 1051, a correction characteristic image module coordinate calculating unit 1052, a correction parameter calculating unit 1053, an image module pixel point calculating unit 1054 and an image module grayscale calculating unit 1055. According to the version parameter (e.g., the version No.), the image module parameter calculating unit 1051 acquires the number of rows of image modules, the number of columns of image modules and the number of image modules corresponding to the version parameter by looking up a table or through functional calculation according to the version parameter (e.g., the version No.). The correction characteristic image module coordinate calculating unit 1052 calculates relative positions of the pixel coordinates in the barcode region according to the pixel coordinates of the correction characteristics provided by the correction characteristic acquiring unit 104 and the barcode parameter, and calculates image module coordinates of the correction characteristics according to the relative positions and the image module parameter. The correction parameter calculating unit 1053 calculates the correction parameter according to the pixel coordinates and the image module coordinates of the correction characteristic. The correction parameter reflects a mapping relationship between pixel points of the barcode image and the barcode modules. The image module pixel point calculating unit 1054 calculates pixel points corresponding to individual image modules according to the image module parameter and the correction parameter.

The mapping between the image modules and the pixel points may be implemented in various ways, including perspective transformation, quadratic polynomial, cubic polynomial, triangular grid, wavelet transformation, or a combination thereof. The modular pixel point calculating unit 1054 can calculate coordinates of corresponding pixel points according to the image module coordinates, or calculate the corresponding image module coordinates according to the pixel coordinates. The present disclosure has no limitation on the calculation process described above and the way in which it is accomplished. The image module grayscale calculating unit 1055 calculates grayscale values corresponding to individual image modules according to coordinates and grayscale values of pixel points corresponding to the individual image modules to construct the image module map. The grayscale values of the image modules can be calculated in various ways, including statistical calculation, interpolation, averaging calculation, weighting calculation, or a combination thereof. The present disclosure has no limitation on the calculation process described above and the way in which it is accomplished.

To make it easier for those skilled in the art to understand the process made by the image module information processing unit of the present disclosure, a calculation method will now be described as an example to illustrate the transformation principle of the image module information processing unit of the present disclosure. However, this calculation method shall not be construed as a limitation on the image module information processing unit of the present disclosure.

Figure 12:
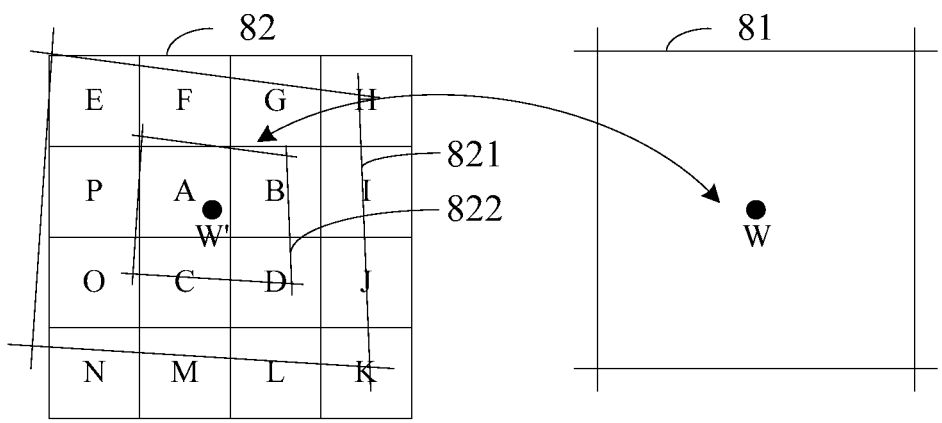
FIG. 12 is a schematic view illustrating transformation principles of an image module information processing unit in a matrix-type 2D barcode identifying module according to an embodiment of the present disclosure.

FIG. 12 is a schematic view illustrating transformation principles of an image module information processing unit in a matrix-type 2D barcode identifying module according to an embodiment of the present disclosure. There is a mapping relationship between the image module 81 and the pixel region 82, and a deformation region 821 corresponds to the mapping range of the image module 81 in the pixel region 82. A central point W of the image module 81 is mapped to a mapping point W' in the pixel region 82. As is shown in FIG. 12, the image module 81 corresponds to sixteen pixel points, i.e., the pixel points A-P, among which the pixel points A, B, C, D surround the mapping point W'. A central deformation region 822 corresponds to a mapping range of the central region of the image module 81 in the pixel region 82. For the matrix-type barcode, the central region of the image module reflects the value of the image module most accurately. In a preferred embodiment, a grayscale value of the central point W corresponding to the mapping point W' can be calculated according to grayscale values of the four pixel points A, B, C, D. Of course, the grayscale value of the image module 81 may also be calculated according to all pixel points corresponding to the pixel region 82. That is, the grayscale value of the image module 81 can be calculated according to grayscale values of a number of pixel points corresponding to the image module 81.

The binarizing unit 106 receives the image module grayscale values calculated by the image module information processing unit 105, and binarizes the image module map according to a threshold to extract a bit map. The threshold may be preset, obtained through global threshold acquisition or local threshold acquisition, or obtained in other ways.

According to the mask pattern obtained by the version and format parameter acquiring unit 103, the codeword extracting unit 107 performs a de-masking operation (e.g., an XOR operation) on the bit map to remove the mask and restore a bit stream representing a data codeword and an error correction codeword, extracts the bit stream according to the arrangement rules of matrix-type 2D barcodes, and transforms the bit stream into a codeword. In some cases, the barcode was not processed by using a mask pattern when it is generated, so the codeword extracting unit 107 can extract a bit stream representing a data codeword and an error correction codeword directly from the bit map and transform the bit stream into a data codeword and an error correction codeword.

The error correction and decoding unit 108 re-arranges the data codeword and the error correction codeword in terms of blocks according to the version No, and the error correction level obtained by the version and format parameter acquiring unit 103, and performs error detection and error correction operations thereon to correct deletion errors and unknown errors until the maximum error correction capacity defined by the version No, and the error correction level is reached. Then, the error correction and decoding unit 108 re-assembles a data block sequence to restore a data bit stream representing the matrix-type 2D barcode information, and decodes the restored data bit stream to obtain matrix-type 2D barcode information.

Figure 13:
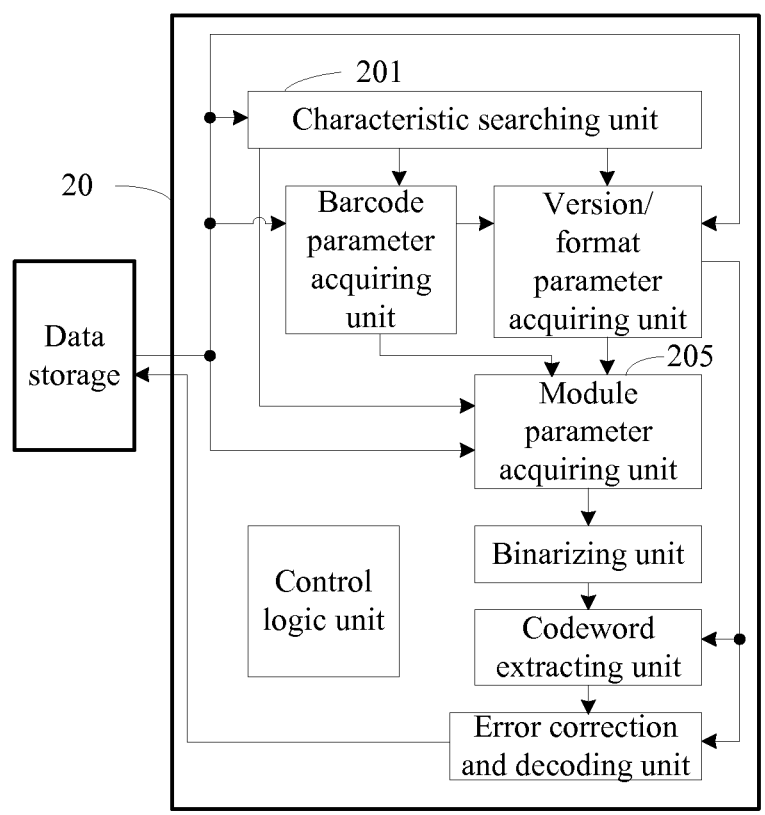
FIG. 13 is a schematic structural view of a matrix-type 2D barcode identifying module according to another embodiment of the present disclosure.

FIG. 13 is a schematic structural view of a matrix-type 2D barcode identifying module according to another embodiment of the present disclosure. Different from the matrix-type 2D barcode identifying module of the previous embodiment, the matrix-type 2D barcode identifying module 20 of this embodiment has the following improvements: searching of the functional patterns or correction characteristics is accomplished by the characteristic searching unit 201 and the correction characteristic acquiring unit is cancelled.

Similar to the previous embodiment, the characteristic searching unit 201 determines pixel coordinates of the characteristic pattern in the barcode image by searching for the characteristic pattern in the barcode image. The characteristic pattern is, for example, a position detection pattern. By adjusting the image module dimension ratio of the template matching or the image module coordinates, the characteristic searching unit 201 can also search for other characteristic patterns, for example, correction patterns. The characteristic searching unit 201 generates a correction pattern detecting template according to the image module dimension ratio of the correction pattern. Then, the correction pattern detecting template is translated relative to the barcode image and a grayscale matching operation is performed thereon. The characteristic searching unit 201 calculates similarities of the matching results to determine an optimal matching position between the correction pattern detecting template and the barcode image, and determines the pixel coordinates and grayscale values of a central point or marginal points of the correction pattern in the barcode image according to the optimal matching position.

The characteristic patterns include but are not limited to functional patterns of the barcode such as position detection patterns, correction patterns, positioning patterns and the like. For ease of understanding by those skilled in the art, other forms of the characteristic patterns than the functional patterns will be illustrated hereinafter. The matrix-type 2D barcode is a kind of 2D barcodes, and the barcode symbol pattern thereof has characteristics of an arithmetic matrix. The barcode symbols may be considered to include a plurality of dark-colored and light-colored rectangular image modules. By choosing a set of rectangular image module patterns that are easy to be distinguished from adjacent ones in the barcode image region, a dynamic characteristic template can be formed. Additionally, by searching for two image modules of the same color (i.e., dark-colored image modules or light-colored image modules) spaced apart in a same row or column of the barcode image, a scribing characteristic template can be formed.

The characteristic searching unit 201 generates a detection template for the dynamic characteristic template or the scribing characteristic template according to an image module dimension ratio corresponding to image module coordinates of the dynamic characteristic template or the scribing characteristic template, translates the detection template for the dynamic characteristic template or the scribing characteristic template relative to the barcode image and performs a grayscale matching operation thereon. Similarities of the matching results are calculated to determine an optimal matching position between the detection template for the dynamic characteristic template or the scribing characteristic template and the barcode image, and the pixel coordinates and grayscale values of central points or marginal points of the dynamic characteristic template or the scribing characteristic template in the barcode image are determined according to the optimal matching position.

The image module information processing unit 205 directly receives the pixel coordinates of the characteristic patterns, which are provided by the characteristic searching unit 201, as the correction characteristic for processing. The correction characteristics are, for example, pixel coordinates of central points and marginal points of position detection patterns in the barcode image, pixel coordinates of central points and marginal points of the correction patterns, pixel coordinates of the positioning patterns, or pixel coordinates of central points of the dynamic characteristic pattern or the scribing characteristic template.

Figure 14:
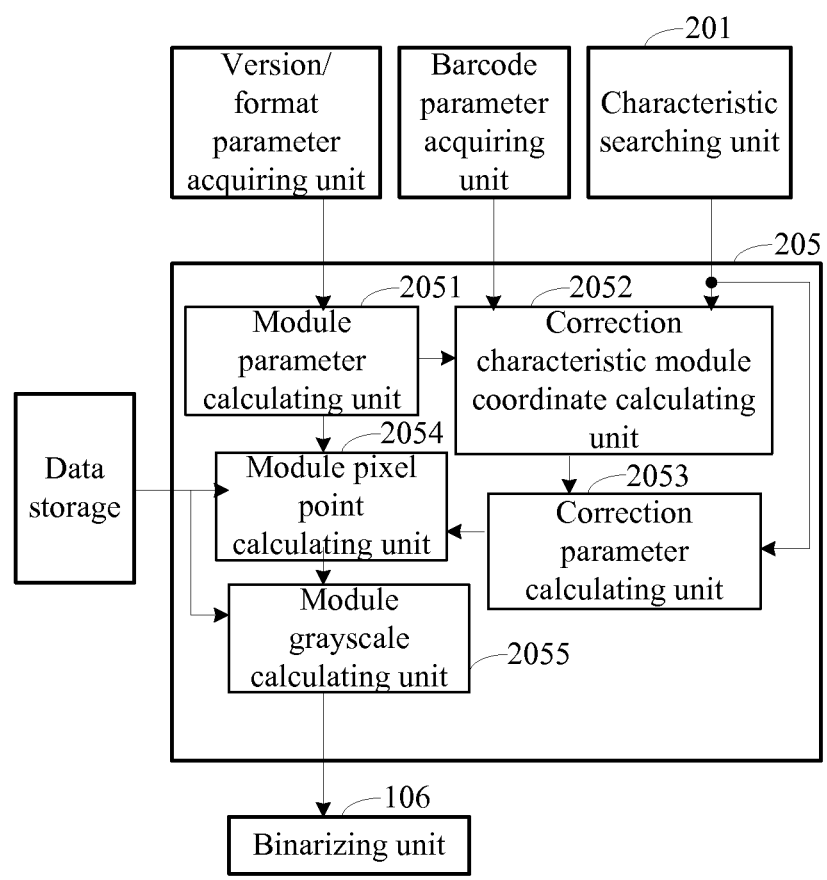
FIG. 14 is a schematic view of a second kind of correction point acquisition structure of a correction characteristic acquiring unit in a matrix-type 2D barcode identifying module according to another embodiment of the present disclosure.

FIG. 14 is a schematic view of an image module information processing unit in a matrix-type 2D barcode identifying module according to another embodiment of the present disclosure. Different from the previous embodiment, the correction characteristic image module coordinate calculating unit 2052 is connected to the characteristic searching unit 201 and calculates the image module coordinates of the characteristic patterns according to the image module parameter provided by the image module parameter calculating unit 2051 and the barcode parameter. The correction parameter calculating unit 2053 calculates the correction parameter according to the pixel coordinates and the image module coordinates of the characteristic patterns. The correction parameter reflects a mapping relationship between the pixel points of the barcode image and the barcode modules. The image module pixel point calculating unit 2054 calculates pixel points corresponding to individual image modules according to the image module parameter and the correction parameter. Calculation of the mapping between the image modules and the pixel points may be accomplished in various ways, including perspective transformation, quadratic polynomial, cubic polynomial, triangular grid, wavelet transformation, or a combination thereof. The image module grayscale calculating unit 2055 calculates grayscales corresponding to individual image modules according to the coordinates and grayscale values of the pixel points corresponding to the individual image modules to construct an image module map.

According to the matrix-type 2D barcode decoding method of the present disclosure, by searching for correction characteristics, pixel coordinates and image module coordinates of the correction characteristics are acquired, a mapping relationship between the pixel coordinates and the image module coordinates of the barcode image is calculated, image module grayscale values are calculated according to the mapping relationship, and then the image module grayscale values are binarized to restore the barcode symbol patterns corresponding to the matrix-type 2D barcode. As compared to the prior art, the matrix-type 2D barcode decoding method performs the binarizing process after the barcode characteristic information has been known and the barcode image has been corrected according to the barcode characteristic information. As a result, influence of such factors as noises and distortions on the binarizing process is decreased and occurrence of image module errors is reduced, which remarkably increases the capability of identifying the barcode and improves the possibility of successfully decoding the barcode.

The matrix-type 2D barcode identifying module of the present disclosure is of a pipeline hardware structure, and identification and decoding of the barcode image are accomplished by hardware logics. Because the pipeline hardware structure is adapted to carry out pipeline operations and parallel processing on the barcode image, the processing speed is very high.

As compared to the typical decoding technologies for processors, the matrix-type 2D barcode identifying module of the present disclosure is completely of a hardware structure without need of involvement of a processor in the decoding process. As compared to a processor, the chip structure has a more simple structure, a smaller area, lower power consumption and lower cost, and is easy to be integrated, so it is suitable for portable applications. Therefore, the present disclosure may be conveniently combined with the network of things, which provides a wider space for development of the barcode technology.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A matrix-type two-dimensional (2D) barcode decoding chip, comprising:
   a data storage configured for storing a barcode image;
   at least two matrix-type 2D barcode identifying modules configured for processing the barcode image in parallel; and
   a master-control logic module configured for controlling operational statuses of the at least two matrix-type 2D barcode identifying modules so that the at least two matrix-type 2D barcode identifying modules call the barcode image stored in the data storage in sequence.

2. The matrix-type 2D barcode decoding chip of claim 1, wherein each of the matrix-type 2D barcode identifying modules comprises:
   a characteristic searching unit configured for searching for a characteristic pattern in the barcode image to determine pixel coordinates of the characteristic pattern;
   a barcode parameter acquiring unit configured for acquiring a barcode parameter according to the pixel coordinates of the characteristic pattern;
   a version and format parameter acquiring unit configured for acquiring a version and format parameter;
   a correction characteristic acquiring unit configured for searching for a characteristic position in the barcode image and acquiring a correction characteristic according to the characteristic position;
   an image module information processing unit configured for calculating a grayscale value corresponding to an image module according to the version and format parameter, the barcode parameter and the correction characteristic;
   a binarizing unit configured for binarizing the image module;
   a codeword extracting unit configured for extracting a codeword according to the binarized image module; and
   an error correction and decoding unit configured for decoding the codeword.

3. The matrix-type 2D barcode decoding chip of claim 2, wherein the characteristic searching unit generates a characteristic pattern detection template according to a module dimension scale of the characteristic pattern, translates the characteristic pattern detection template relative to the barcode image, executes a grayscale matching process to determine an optimal matching position between the characteristic pattern detection template and the barcode image, and determines the pixel coordinates of the characteristic pattern in the barcode image according to the optimal matching position.

4. The matrix-type 2D barcode decoding chip of claim 2, wherein the characteristic searching unit detects boundary points between dark-colored image modules and light-colored image modules in the barcode image through scanning, compares a spacing relationship between the boundary points with an image module dimension scale of the characteristic pattern, and determines the pixel coordinates of the characteristic pattern in the barcode image according to the comparison result.

5. The matrix-type 2D barcode decoding chip of claim 2, wherein the characteristic searching unit extracts from a predetermined region of the barcode image a plurality of black-white boundary line segments of a predetermined length, forms a plurality of straight lines from the plurality of black-white boundary line segments, groups the plurality of straight lines into a row parallel line group and a column parallel line group according to characteristics of parallel lines, and finally, identifies a type of the matrix-type 2D barcode by making a determination on a grid formed by the row parallel line group and the column parallel line group and according to characteristics of the matrix-type 2D barcode, and acquires the pixel coordinates of the characteristic pattern in the grid formed by the row parallel line group and the column parallel line group.

6. The matrix-type 2D barcode decoding chip of claim 2, wherein, according to the pixel coordinates of the characteristic pattern and the barcode parameter, the version and format parameter acquiring unit extracts version information and format information from the barcode image, and decodes the version information and the format information to acquire the version and format parameter.

7. The matrix-type 2D barcode decoding chip of claim 2, wherein the version and format parameter acquiring unit acquires the version and format parameter through estimation according to possible formats and possible versions of the matrix-type 2D barcode.

8. The matrix-type 2D barcode decoding chip of claim 2, wherein the image module information processing unit comprises an image module parameter calculating unit, a correction characteristic image module coordinate calculating unit, a correction parameter calculating unit, an image module pixel point calculating unit and a module grayscale value calculating unit, and wherein the image module parameter calculating unit acquires an image module parameter according to the version and format parameter, the correction characteristic image module coordinate calculating unit calculates image module coordinates of the characteristic pattern according to the barcode parameter, the image module parameter and the pixel coordinates of the characteristic pattern, the correction parameter calculating unit calculates a mapping relationship between the pixel coordinates and the image module coordinates of the barcode image according to the pixel coordinates of the characteristic pattern and the image module coordinates of the characteristic pattern, and the image module pixel point calculating unit calculates pixel coordinates corresponding to individual image modules according to the mapping relationship, and the image module grayscale value calculating unit calculates the grayscale values of the individual image modules according to the pixel coordinates corresponding to the individual image modules.

9. The matrix-type 2D barcode decoding chip of claim 1, wherein the matrix-type 2D barcode identifying modules comprises:
- a characteristic searching unit configured for searching for a characteristic pattern in the barcode image to determine pixel coordinates of the characteristic pattern;
- a barcode parameter acquiring unit configured for acquiring a barcode parameter according to the pixel coordinates of the characteristic pattern;
- a version and format parameter acquiring unit configured for acquiring a version and format parameter;
- a module information processing unit configured for calculating a grayscale value corresponding to an image module according to the version and format parameter, the barcode parameter, and the pixel coordinates of the characteristic pattern;
- a binarizing unit configured for binarizing the image module;
- a codeword extracting unit configured for extracting a codeword according to the binarized image module; and
- an error correction and decoding unit, being configured to decode the codeword.

10. The matrix-type 2D barcode decoding chip of claim 9, wherein the characteristic searching unit searches for a first characteristic pattern in the barcode image to determine pixel coordinates of the first characteristic pattern, and the barcode parameter acquiring unit acquires the barcode parameter according to the pixel coordinates of the first characteristic pattern.

11. The matrix-type 2D barcode decoding chip of claim 10, wherein the characteristic searching unit searches for a second characteristic pattern in the barcode image to determine pixel coordinates of the second characteristic pattern, and the image module information processing unit calculates a grayscale value corresponding to the image module according to the version and format parameter, the barcode parameter, and the pixel coordinates of the second characteristic pattern.

12. The matrix-type 2D barcode decoding chip of claim 1, wherein the matrix-type 2D barcode identifying modules are identifying modules corresponding to different identifying rules.

13. A method for decoding a matrix-type two-dimensional (2D) barcode, the method being implemented by a matrix-type 2D barcode decoding chip, the method comprising the following steps of:
- acquiring an image of the barcode stored in a data storage by a master-control logic module of the matrix-type 2D barcode decoding chip;
- searching for a characteristic pattern to obtain a barcode parameter by a matrix-type 2D barcode identifying module of the matrix-type 2D barcode decoding chip;
- acquiring a version parameter and acquiring an image module parameter according to the version parameter by the matrix-type 2D barcode identifying module;
- searching for a correction characteristic and acquiring pixel coordinates of the correction characteristic by the matrix-type 2D barcode identifying module;
- calculating image module coordinates of the correction characteristic according to the barcode parameter, the image module parameter, and the pixel coordinates of the correction characteristic by the matrix-type 2D barcode identifying module;
- calculating a mapping relationship between pixel coordinates and image module coordinates of the image according to the pixel coordinates of the correction characteristic and the image module pixels of the correction characteristic by the matrix-type 2D barcode identifying module;
- calculating an image module grayscale value according to the mapping relationship by the matrix-type 2D barcode identifying module;
- binarizing the image module grayscale value by the matrix-type 2D barcode identifying module;
- extracting a codeword according to a result of the binarizing step by the matrix-type 2D barcode identifying module; and
- decoding the codeword by the matrix-type 2D barcode identifying module.

14. The method for decoding a matrix-type 2D barcode of claim 13, wherein the step of searching for a characteristic pattern to obtain a barcode parameter further comprises generating a characteristic pattern detection template according to a module dimension scale of the characteristic pattern, translating the characteristic pattern detection template relative to the barcode image, executing a grayscale matching process to determine an optimal matching position between the characteristic pattern detection template and the barcode image, determining the pixel coordinates of the characteristic pattern in the barcode image according to the optimal matching position, and acquiring a barcode parameter according to the pixel coordinates of the characteristic pattern.

15. The method for decoding a matrix-type 2D barcode of claim 13, wherein the step of searching for a characteristic pattern to obtain a barcode parameter further comprises detecting boundary points between dark-colored image modules and light-colored image modules in the barcode image through scanning, comparing a spacing relationship between the boundary points with an image module dimension scale of the characteristic pattern, determining the pixel coordinates of the characteristic pattern in the barcode image according to the comparison result, and acquiring a barcode parameter according to the pixel coordinates of the characteristic pattern.

16. The method for decoding a matrix-type 2D barcode of claim 13, wherein the step of searching for a characteristic pattern to obtain a barcode parameter further comprises extracting from a predetermined region of the barcode image a plurality of black-white boundary line segments of a predetermined length, forming a plurality of straight lines from the plurality of black-white boundary line segments, grouping the plurality of straight lines into a row parallel line group and a column parallel line group according to characteristics of parallel lines, identifying a type of the matrix-type 2D barcode by making a determination on a grid formed by the row parallel line group and the column parallel line group and according to characteristics of the matrix-type 2D barcode, acquiring the pixel coordinates of the characteristic pattern in the grid formed by the row parallel line group and the column parallel line group, and finally, acquiring a barcode parameter according to the pixel coordinates of the characteristic pattern.

17. The method for decoding a matrix-type 2D barcode of claim 13, wherein the step of acquiring a version parameter and acquiring an image module parameter according to the version parameter further comprises extracting version information and format information from the barcode image, and decoding the version information and the format information to acquire a version and format parameter.

* * * * *